Feb. 3, 1953
J. H. LE BOEUF
2,627,293
LOCK NUT
Filed Feb. 27, 1948
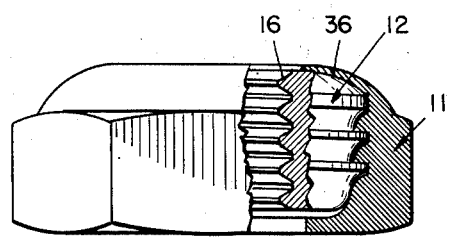
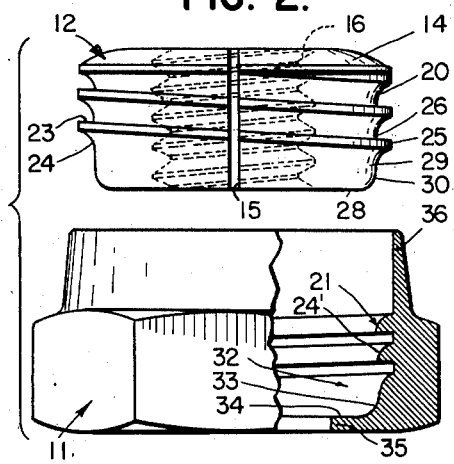
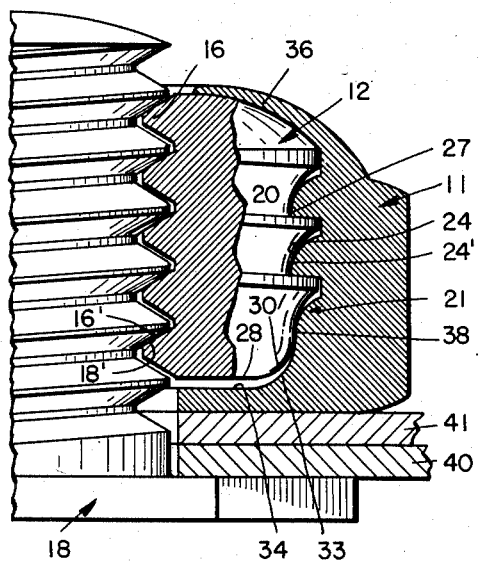
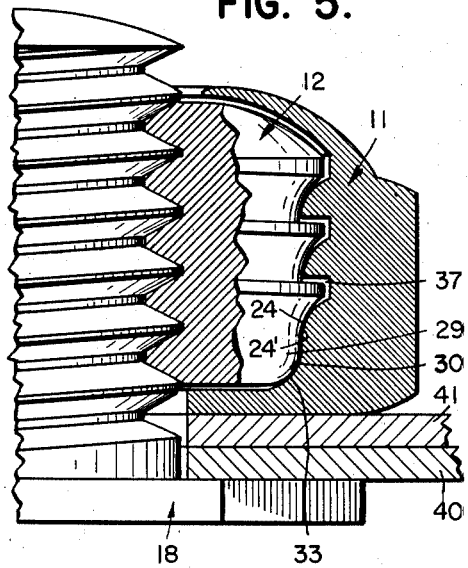
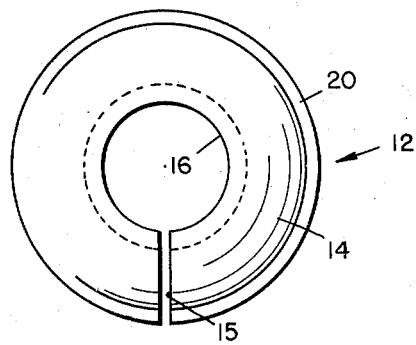
*INVENTOR.*
JEFFRE H. LE BOEUF
BY
*Mason & Graham*
ATTORNEYS Patented Feb. 3, 1953

2,627,293

UNITED STATES PATENT OFFICE 2,627,293

LOCK NUT

Jeffre H. Le Boeuf, Pasadena, Calif., assignor to Jeffre H. Le Boeuf and Helen Williamson Le Boeuf, Pasadena, Calif., as joint tenants Application February 27, 1948, Serial No. 11,429

10 Claims. (Cl. 151—19)

This invention has to do with lock nuts.

An object of the invention is to provide a novel lock nut of simple construction which may be threaded onto a bolt or screw in the manner of an ordinary nut and which does not require any clamping or holding elements apart from the nut itself.

Another object is to provide a lock nut which incorporates a means of locking and unlocking as an integral part of the nut's structure, so that the performance of these functions will not be dependent upon distortion, but will take place automatically and in a reliable manner, permitting the lock nut to be used repeatedly without damage to the nut or to the bolts or screws with which it is employed.

A further object is to provide a lock nut that is constructed in a manner to permit of its being unlocked by a partial turn thereof by manual wrenching when the nut is removed from the screw.

A particular object of this invention is to provide a two-piece lock nut embodying a shell and a core in which the core is caused to firmly engage and bind upon the threads of the screw or bolt on which it is threaded when the nut is tightened against the work. Another object is to provide a two-piece lock nut embodying a shell and a core, in which the core thread is caused to firmly engage all of the thread of the screw located within the core with an equal amount of gripping action when the nut is tightened against the work.

These and other objects will be apparent from the drawing and the following description thereof.

Referring to the drawing, which is for illustrative purposes only:

Fig. 1 is an elevational view partly in section of a lock nut embodying the invention;

Fig. 2 is an exploded view of the parts of the lock nut before assembly, showing a portion of the shell in section;

Fig. 3 is a plan view of the core member of the lock nut;

Fig. 4 is an enlarged fragmentary sectional view showing the lock nut applied to a screw and with relation to work to be held; and Fig. 5 is a view similar to Fig. 3 but showing the parts in locked or tightened position.

More particularly describing the invention, reference numeral 11 generally indicates the shell and 12 the core of the two-piece lock nut of the invention. Referring to the core, this element comprises a body 14 of substantially annular shape being provided with a longitudinally extending split 15 which extends radially of the element and parallel to the axis of the body. The core is provided with an inner thread 16 which corresponds to the thread of the screw upon which the nut is to be used, such a screw being shown in Figs. 4 and 5 wherein it is generally indicated by numeral 18.

The core is adapted to be received within the shell 11 for limited axial movement therein, and spirally extending means are provided on the core and shell for contracting the core into intimate engagement with the threads of the screw as the nut is tightened on the screw against the work. This means comprises, generally, what will be referred to as interengaging screw threads 20 on the core and 21 in the shell of peculiar shape, the threads being reversely disposed with respect to the inner thread 16 of the core. Thus, for the standard right-hand threaded nut the inner thread 16 of the core will be a right-hand thread, and the threads 20, 21 between the core and shell will be left-hand.

In the form of the invention shown, the profile of the threads 20, 21 is such that, referring to the thread 20 on the core, this thread is characterized by a flat outer side 23 which extends radially at substantially right angles to the axis of the core and by a sloping inner side 24. Intermediate the outer and inner sides is a flat or cylindrical crest 25. Preferably, on the core the sloping inner side of the thread 24, in cross section, is concavely curved and terminates in a flat or cylindrical section 26 which is above the flat outer side 23 of the next adjacent convolution of the thread. The profile of the thread 21 in the shell corresponds to the profile of the thread on the core except for the fact that the convexly curved arcuate section 24' of the thread in the shell has a slightly smaller radius than the arc of the corresponding curved inner side 24 of the thread on the core, and except for the fact that the arcs of the sections 24, 24' are so related with the parts assembled that they are substantially tangential at the point 27.

The thread 20 on the core runs out at a point spaced axially from the inner end 28 of the core, leaving a reduced end section 29 on the core which is tapered on an arc as indicated at 30. The radius of this arc is substantially the same as the radius of the arcuate section 24' of the shell. The shell is provided with a socket 32 for receiving the end section 29 of the core, this socket being characterized in cross section by an arcuate wall 33 which terminates in an annular flat wall 34 formed by an inwardly extending flange 35. The arcuate wall 33 has a radius substantially the same as the radius of the section 24 of the core. As viewed in cross section, the surfaces 30—33 of the core and shell respectively are substantially tangential at 38.

In assembly of the parts, the core is threaded into the shell to the position in which it is shown in Fig. 4, after which the outer dome section 36 of the shell is pressed in over the core from the position in which it is shown in Fig. 2 to that which it is shown in the other figures, thereby retaining the core within the shell.

It is to be noted that with the parts in this position the inner end 28 of the core is spaced from the surface at the inner end of the shell and that the opposing sloping sides 24, 24′ of the threads 20, 21 by reason of their tangential relation provide a space 37 which converges inwardly of the crest of the threads to the line of tangency 27. It will also be noted that the reverse of this condition is provided in the space at the region of the inner end of the core and the socket in the shell.

It will be apparent from the above that the opposing relation of the tangential arcuate flanges of the external nut threads to the lower arcuate flanges of the core body and shell cavity, automatically regulate the maintenance of the core in a position that remains parallel to the screw and to the shell, during core contraction and expansion. Thus, as the nut tightens on the screw, the core contracts inward and slightly downward in equalized degree throughout its length and this, in turn, produces constriction of the screw threads of equal extent by the internal threads of the core, thereby preventing galling or other damage to the screw and to the nut threads, as well as preventing unequal pressure of the core against the shell at any one point at the time of initiation of core contraction.

In application of the nut, referring particularly to Figs. 4 and 5, the nut as a whole is threaded onto the screw 18 until it bears against the work, shown as a pair of sheets 40, 41 to be secured together. When the nut has been threaded onto the screw to this position, only the outer sides 16′ of the inner thread 16 of the core engage the thread 19′ of the screw. As the shell is further rotated in a clockwise direction, the threads 16 in the core tend to seize the thread 18′ on the screw and prevent further rotation of the core. As the shell is then rotated further, the interengaging threads 20, 21 of the core and shell tend to force the core axially toward the head of the screw by reason of the camming action of the opposed curved sections 24, 24′, and of the opposing curved end 30 and surface 33 in the shell, whereby the core of the nut is contracted into intimate engagement with the thread 18′ on the screw to the position in which the parts are shown in Fig. 5, thereby securely locking the nut on the screw.

On removal of the locknut from the screw, rotation of the shell approximately one-half turn initiates automatic unlocking of the nut by releasing the gripping action of the internal core thread, thus permitting the nut to be spun off the screw as the core expands outward and slightly upward until a position of disengagement is attained between the internal threads of the core and the threads of the screw.

It is contemplated that the parts of the lock nut may be formed of metal, such as steel, brass or aluminum, for most uses; however, other materials may be used depending upon the particular use to which the lock nut is to be put. Assuming the lock nut were made from steel, the core will ordinarily have some spring quality and this is desirable in removing the nut where the same is to be used again since it will cause the core to return to its original position when the shell is backed off the screw.

It will be apparent that the lock nut described provides a construction wherein the core member thereof is evenly forced into contracted intimate engagement with the screw on which the nut is mounted by the final rotation of the shell through the construction of the peculiar thread between core and shell.

Although the invention has been particularly shown and described, it is contemplated that various changes and modifications may be made without departing from the scope thereof as indicated by the following claims.

I claim:
1. A lock nut adapted to be screw-threaded onto a screw or the like into end abutting relation to a member to be secured by the nut and screw comprising a longitudinally split substantially annular core provided with an inner thread corresponding to the thread of the screw, an annular shell housing said core and freely receiving the screw, said core being mounted for limited axial movement in the shell, said shell and core being provided with interengaging screw threads disposed reversely to the inner thread of the core, said interengaging screw threads being characterized by a flat outer side extending radially at substantially right angles to the axis of the thread and by a sloping inner side.

2. A lock nut adapted to be screw-threaded onto a screw or the like into end abutting relation to a member to be secured by the nut and screw comprising a longitudinally split substantially annular core provided with an inner thread corresponding to the thread of the screw, an annular shell housing said core and freely receiving the screw, said core being mounted for limited axial movement in the shell, and interengaging means on said shell and said core for causing said core to contract into intimate binding engagement with the screw upon relative rotation of the shell and core, said interengaging means being spirally disposed reversely to the spiral of the inner thread of said core, said shell terminating at its inner end in an annular socket converging toward the inner end of the shell, said shell being constructed and arranged to freely receive said core in its normal condition at substantially the outer limit of the range of axial movement of the case in the shell whereby the assembled normal relative position of said shell and core is such that the inner end of said core is spaced outwardly of the base of the socket.

3. A lock nut adapted to be screw threaded onto a screw or the like into end abutting relation to a member to be secured by the nut and screw comprising a longitudinally split substantially annular core provided with an inner thread corresponding to the thread of the screw, an annular shell housing said core and freely receiving the screw, said core being mounted for limited axial movement in the shell, said shell and core being provided with interengaging screw threads disposed reversely to the inner thread of the core, said interengaging screw threads being characterized by a flat outer side extending radially at substantially right angles to the axis of the thread and by a sloping inner side, said sloping inner side being concavely arcuate in cross section on the thread of said core and convexly arcuate in cross section on the thread of said shell.

4. A lock nut as defined in claim 3 in which the arcuate section on the core has a slightly greater radius than the arcuate section on the shell and in which said arcuate sections are substantially tangential at a point intermediate the crest of the thread.

5. A lock nut adapted to be screw threaded onto a screw or the like into end abutting relation to a member to be secured by the nut and screw comprising a longitudinally split substantially annular core provided with an inner thread corresponding to the thread of the screw, an annular shell housing said core and freely receiving the screw, said core being mounted for limited axial movement in the shell, said shell and core being provided with interengaging screw threads disposed reversely to the inner thread of the core, said interengaging screw threads being characterized by a flat outer side extending radially at substantially right angles to the axis of the core and by a sloping inner side, said sloping inner side being concavely arcuate in cross section on the thread of said core and convexly arcuate in cross section on the thread of said shell, said shell terminating at its inner end in an annular socket of concavely arcuate shape in cross section and said core having an inner end portion having a convexly curved outer surface in cross section and being so proportioned to said shell that the inner end portion is spaced from the base of the socket when the core is at substantially the outer limit of the range of travel of said core axially in said shell.

6. A lock nut as defined in claim 5 in which the arcuate section of the core thread has a slightly greater radius than the arcuate section on the shell thread and in which said arcuate sections are substantially tangential at a point intermediate the crest of the thread.

7. A lock nut adapted to be screw threaded onto a screw or the like into end abutting relation to a member to be secured by the nut and screw comprising a longitudinally split substantially annular core provided with an inner thread corresponding to the thread of the screw, an annular shell housing said core, said core being mounted for limited axial movement in the shell, said shell and core being provided with interengaging screw threads disposed reversely to the inner thread of the core, said interengaging screw threads being characterized by a flat outer side extending radially at substantially right angles to the axis of the core and by a sloping inner side, said sloping inner side being concavely arcuate in cross section on the thread of said core and convexly arcuate in cross section on the thread of said shell, said arcuate section of the core thread having a slightly greater radius than the arcuate section on the shell thread and said arcuate sections being substantially tangential at a point intermediate the crest of the thread, said shell terminating at its inner end in an annular socket of concavely arcuate shape in cross section and said core having an inner end portion having a convexly curved outer surface in cross section and being so proportioned to said shell that the inner end portion cannot normally engage the base of said socket without contraction of the core, the arcuate section of said socket being on a radius the same as the radius of the arcuate section of the core thread and the convexly curved inner end portion of said core being on a radius the same as the radius of the arcuate section of the thread on said shell, said arcuate section of said socket and said curved portion of said inner end of said core being substantially tangential at a point inwardly of the base of the socket when the parts are in normal position.

8. A screw-threaded connection for a cylindrical inner and a cylindrically bored outer member comprising an external screw thread on the inner member, said thread being characterized by a flat side extending radially at substantially right angles to the axis of the member and by a sloping side of concavely arcuate cross section and an internal screw thread in the bore of said outer member constructed and arranged to receive the thread on the inner member, said internal screw thread being characterized by a flat side complementary to that of the thread of the inner member and by a sloping side of convexly arcuate cross section.

9. A threaded connection as defined in claim 8 in which the sloping side of the thread of the inner member has a slightly greater radius of curvature in cross section than the radius of curvature of the corresponding portion of the thread of said outer member.

10. A lock nut adapted to be screw-threaded onto a screw or the like into end abutting relation to a member to be secured by the nut and screw comprising a longitudinally split substantially annular core provided with an inner thread corresponding to the thread of the screw, an annular shell housing said core and freely receiving the screw, said shell having an exterior annular surface at its inner end for abutment against the surface of the member to be secured, said core being mounted for limited axial movement in the shell, said shell and core being provided with interengaging screw threads disposed reversely to the inner thread of the core, said interengaging screw threads being characterized by a sloping inner side.

JEFFRE H. LE BOEUF.

REFERENCES CITED

The following references are of record in the file of this patent:

UNITED STATES PATENTS

| Number | Name | Date |
|---|---|---|
| 248,164 | Harvey | Oct. 11, 1881 |
| 889,319 | Martin | June 2, 1908 |
| 1,010,343 | Barry | Nov. 28, 1911 |
| 1,470,528 | Flentjen | Oct. 9, 1923 |
| 2,177,800 | Chapman | Oct. 31, 1939 |
| 2,266,961 | Desbrueres | Dec. 23, 1951 |

FOREIGN PATENTS

| Number | Country | Date |
|---|---|---|
| 516,044 | Great Britain | Dec. 20, 1939 |